United States Patent [19]
Widener

[11] Patent Number: 4,652,421
[45] Date of Patent: Mar. 24, 1987

[54] OUTER GRID STRAP PROTRUDING SPRING REPAIR APPARATUS

[75] Inventor: Wade H. Widener, Cayce, S.C.

[73] Assignee: Westinghouse Electric Corp., Pittsburgh, Pa.

[21] Appl. No.: 772,986

[22] Filed: Sep. 5, 1985

[51] Int. Cl.[4] .......................... G21C 19/00; B21D 1/00
[52] U.S. Cl. ...................................... 376/260; 72/454; 29/402.19; 376/261
[58] Field of Search ............... 376/260, 261, 438, 441, 376/442, 434, 462, 463; 29/723, 400 N, 402.01, 402.05, 402.19, 400 D; 72/305, 316, 454, 390

[56] References Cited

U.S. PATENT DOCUMENTS

| | | | |
|---|---|---|---|
| 1,764,243 | 6/1930 | Cornwell . | |
| 1,847,943 | 3/1932 | Griffin | 72/454 |
| 2,091,844 | 8/1937 | Blake . | |
| 2,834,099 | 5/1958 | Gasper . | |
| 3,816,896 | 6/1974 | Horsfall | 29/402.19 |
| 3,850,795 | 11/1974 | Thome | 376/463 |
| 4,474,730 | 10/1984 | Hellman et al. | 376/462 |
| 4,492,844 | 1/1985 | Kobuck et al. | 376/438 |
| 4,539,738 | 9/1985 | Antol et al. | 29/723 |

*Primary Examiner*—Deborah L. Kyle
*Assistant Examiner*—Dan Wasil

[57] ABSTRACT

An apparatus for repairing a protruding portion of an outer grid strap spring includes a support frame made up of interconnected members defining a generally rectangular opening and a plurality of devices mounted on the frame members above and below the frame opening for attaching the frame to the outer strap of the support grid. At least some of the devices are adjustable for securing the frame in a stationary position on the outer strap so that the frame opening is stationarily aligned with the outwardly protruding spring on the outer strap. A pair of spaced apart rails attached to the members on upper and lower sides of the opeing define a guide channel therebetween which extends along the opening in a first direction. The apparatus also includes a rectangular-shaped slide housing having a pair of spaced vertical flanges on opposite lateral sides thereof defining a passageway through the housing and a guide way extending along the passageway in a second direction generally orthogonal to the first direction. The housing is mounted in the guide channel of the frame for sliding movement along the frame opening back and forth in the first direction between lateral sides thereof for aligning the passageway with the outwardly protruding portion of the outer strap spring. Also, a spring reset mechanism is provided by the apparatus which is operable for resetting the protruding spring to a non-protruding position relative to the outer strap when the mechanism is aligned with the protruding portion of the spring. The apparatus also has a slide block which supports the spring reset mechanism and is mounted in the guide way of the housing for sliding movement along the housing passageway back and forth in the second direction between upper and lower sides thereof for aligning the spring reset mechanism with the protruding spring portion.

12 Claims, 4 Drawing Figures

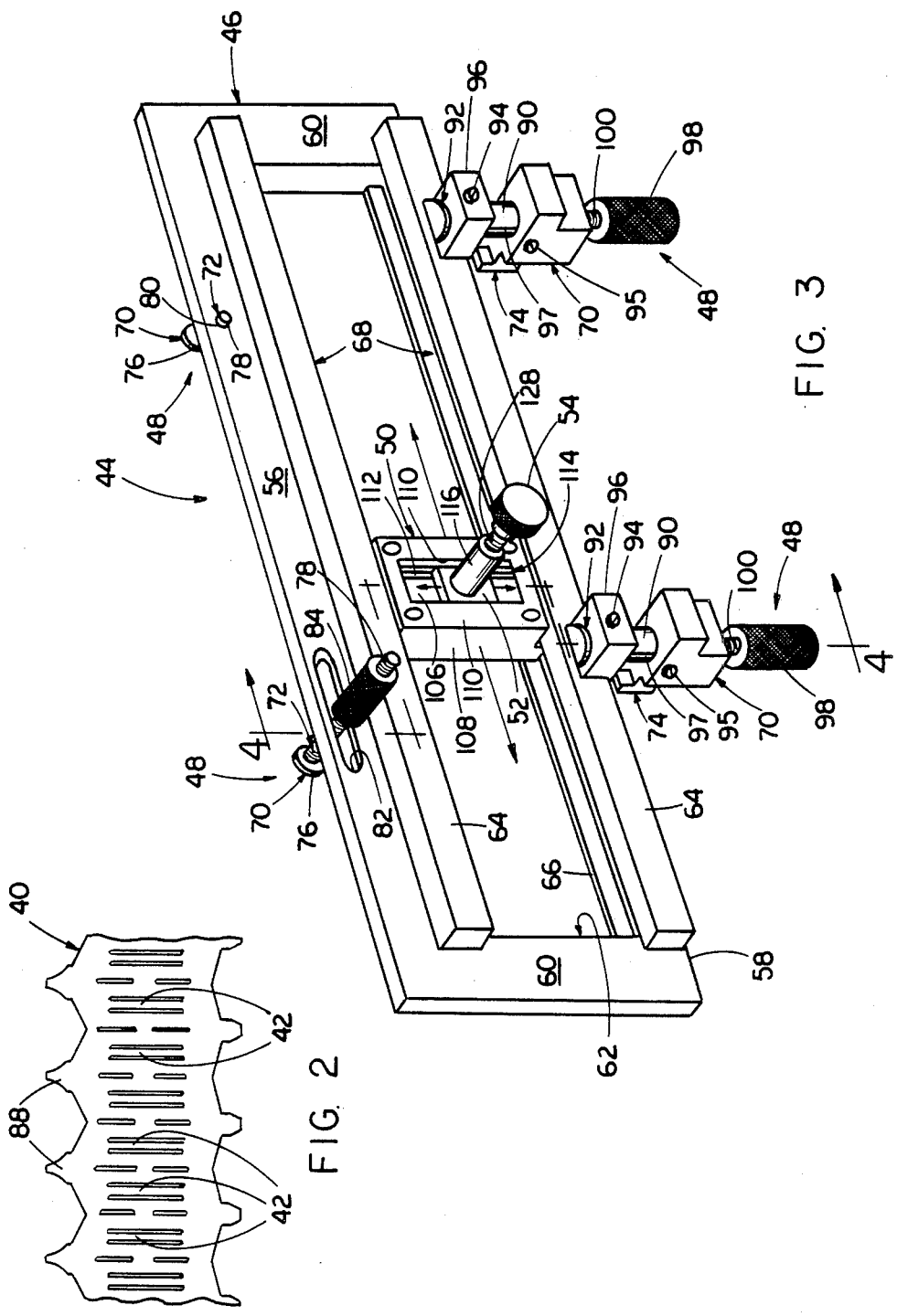

4,652,421

OUTER GRID STRAP PROTRUDING SPRING REPAIR APPARATUS

BACKGROUND OF THE INVENTION

1. Field of the Invention

The present invention relates generally to fuel assemblies for nuclear reactors and, more particulary, is concerned with an apparatus for repairing a grid spring which protrudes outwardly from the outer strap of the grid without applying an impact force thereto.

2. Description of the Prior Art

In most nuclear reactors, the reactor core is comprised of a large number of elongated fuel assemblies. Conventional designs of these fuel assemblies include a plurality of fuel rods held in an organized array by a plurality of grids spaced axially along the fuel assembly length and attached to a fuel assembly. Top and bottom nozzles on opposite ends of the fuel assembly are secured to the guide thimbles which extend slightly above and below the ends of the fuel rods.

The grids as well known in the art are used to precisely maintain the spacing between the fuel rods in the reactor core, prevent rod vibration, provide lateral support for the fuel rods, and, to some extent, frictionally retain the rods against longitudinal movement. Conventional designs of grids include a multiplicity of interleaved inner straps having an egg-crate configuration designed to form cells which individually accept the fuel rods and control rod guide thimbles. The cells of each grid which accept and support the fueld rods at a given axial location theralong typically use relatively resilient springs and relatively rigid protrusions (called dimples) formed into the metal of the interleaved straps. The springs and dimples of each grid cell frictionally engage or contact the respective fuel rod extending through the cell. Additionally, outer straps are attached together and peripherally enclose the inner straps to impart strength and rigidity to the grid. The outer straps conventionally have springs integrally formed into the metal thereof which project into respective ones of the cells disposed along the perimeter of the grid.

In view that the operation of the reactor core involves irradiation of the fuel rods, it is desirable that the supporting forces imposed by the grid on the fuel rods be such that the grid adequately supports the fuel rods but does not promote lengthwise distortion thereof over time. Also, in view that the grids are irradiated along with the fuel rods they support, the grids inherently degrade somewhat over time as a result. In particular, notwithstanding improvements in grid construction, such as illustrated and described in U.S. Pat. No. 4,474,730 assigned to the assignee of the present invention, over the life of the fuel assembly the metal of the interleaved straps forming the grid, and thereby the springs and dimples formed therein, are subject to stress relaxation due to irradiation.

In light of the above conditions, occasionally a few of the grid springs formed in the outer strap of the grid become deformed and portions thereof protrude outwardly from the grid. Since it is desirable to reposition such springs to enhance grid function, protruding grid springs are one of the many items watched for and repaired when discovered during periodic inspection of the fuel assemblies. The presently qualified procedure for repairing protruding grid springs uses a plastic mallet and an adjustment block and requires that a light impact force be applied against the grid to the fuel bundle. Not only does this procedure entail shortcomings from the standpoint of the undesirability of applying even light impacts against the fuel assembly in doing repair work, it also has shortcomings in terms of the lack of uniformity and standardization of the repair results that can be achieved by following it.

Consequently, a need exists for a technique to replace the present procedure of protruding grid spring repair which will achieve its objective in a more uniform and repeatable fashion and without having to impose even light impacts on the fuel assembly.

SUMMARY OF THE INVENTION

The present invention provides an outer grid strap protruding spring repair apparatus designed to satisfy the aforementioned needs. The repair apparatus of the present invention is universally adaptable to all outer spring loicatons on all outer grid straps. The protruding spring can be reset using a pin in the apparatus which applies a constant load to the spring. Thus, the operation of the apparatus will provide a controlled process to assure repeatability and uniformity of repairs, with no impact force applied to the fuel assembly.

Accordingly, the present invention is directed to an apparatus for repairing a spring formed on an outer strap of a fuel assembly grid and having a portion protruding outwardly beyond the strap. The apparatus comprises: (a) a support frame defining an opening and having means defining a guide channel extending along the opening in a first direction; (b) means mounted on the frame and beind adjustable for attaching the frame to the outer strap of the support grid so that the frame opening is aligned with the outwardly protruding spring on the outer strap; (c) an outer slide having a passageway defined therethrough and being mounted in the guide channel for reciprocable movement along the frame opening in the first direction for aligning the passageway with the outwardly protruding portion of the spring on the outer strap, the outer slide also having means defining a guide way extending along the passageway in a second direction generally orthogonal to the first direction; (d) a spring reset mechanism being operable for resetting the protruding spring to a nonprotruding position relative to the outer strap when the mechanism is aligned with the protruding portion of the spring; and (e) an inner slide supporting the spring reset mechanism and being mounted to the guide way for reciprocable movement along the passageway of the outer slide in the second direction for aligning the spring reset mechanism with the protruding portion of the spring on the outer strap.

More particulary, the support frame includes a plurality of interconnected members defining the opening in a generally rectangular configuration, and a pair of spaced apart rails attached to the members on upper and lower sides of the opening so as to define the guide channel therebetween which extends along the opening in the first direction. Also, the adjustable attaching means includes a plurality of devices mounted on the frame above and below the frame opening for attaching the frame to the outer strap of the support grid, with at least some of the devices being adjustable for securing the frame in a stationary position on the outer strap so that the frame opening is stationarily aligned with the outwardly protruding spring on the outer strap. Further, the outer slide is in the form of a rectangular-shaped housing having a pair of spaced vertical flanges on opposite lateral sides thereof defining a passageway through the housing and a guide way extending along the passageway in a second direction generally orthogonal to the first direction, with the housing beind mounted in the guide channel of the frame for sliding movement along the frame opening back and forth in the first direction between lateral sides thereof for aligning the passageway with the outwardly protruding portion of the spring on the outer strap.

Additionally, the inner slide is in the form of a block supporting the spring reset mechanism and being mounted in the guide way of the housing for sliding movement along the housing passageway back and forth in the second direction between upper and lower sides thereof for aligning the spring reset mechanism with the protruding portion of the spring on the outer strap. Finally, the spring reset mechanism includes a reset pin slidably mounted in the inner slide, and a manually-adjustable screw threaded into the inner slide and into engagement with the pin for moving the reset pin toward and into contact with the protruding portion of the spring so as to cause return of the spring to its nonprotruding position.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which:

FIG. 2 is an enlarged fragmentary elevational view of an outer grid strap of one of the support grids on the fuel assembly of FIG. 1, showing the orientations of the springs thereon.

FIG. 3 is a perspective view of the protruding grid spring repair apparatus of the present invention.

DETAILED DESCRIPTION OF THE INVENTION

Figure 1:
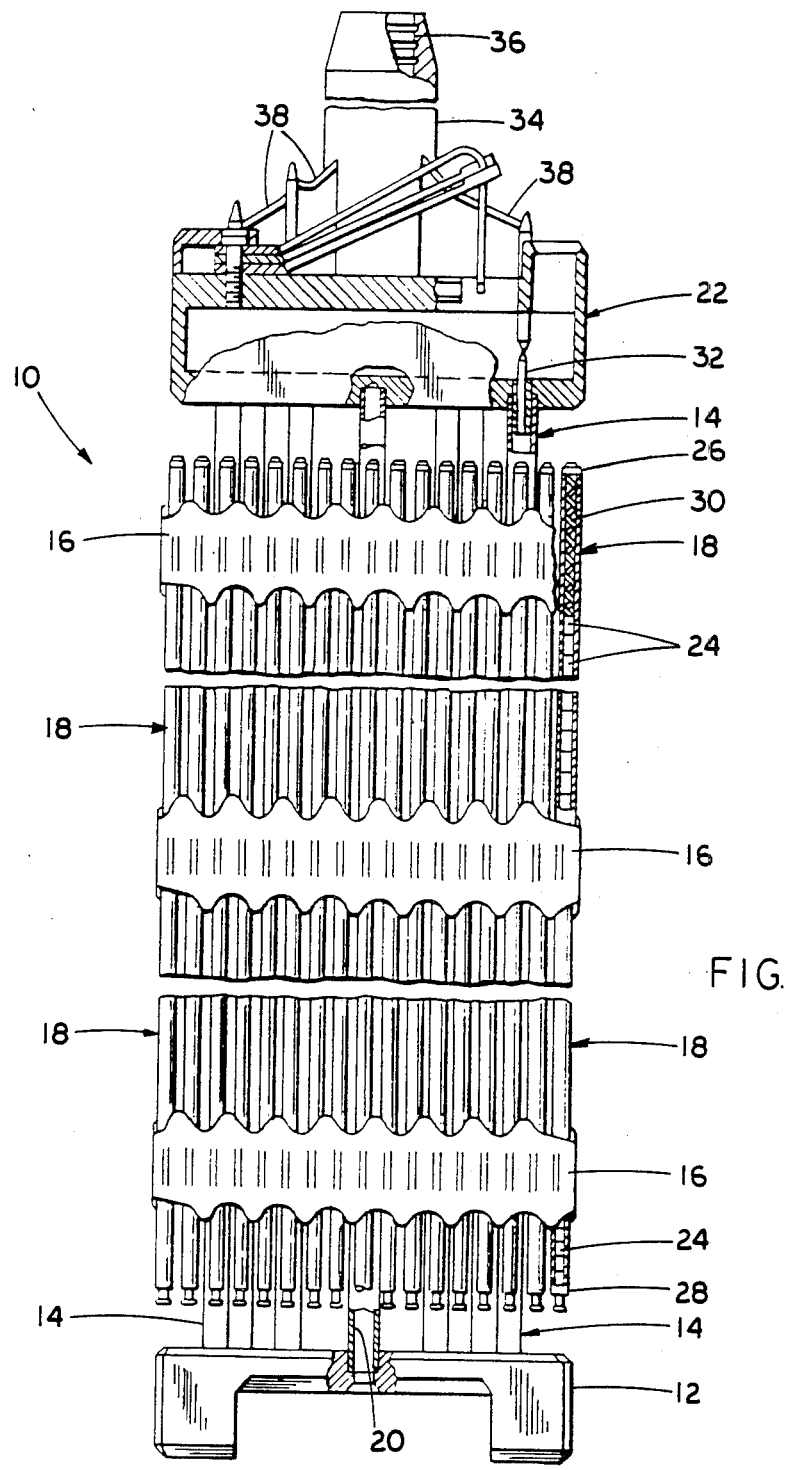
FIG. 1 is an elevational view, partly in section, of a nuclear fuel assembly having fuel rod support grids upon which the apparatus of the present invention can be employed in carrying out outer strap protruding spring repair.

In the following description, like reference characters designate like or corresponding parts throughout the several views. Also in the following description, it is to be understood that such terms as "forward", "rearward", "left", "right", "upwardly", "downwardly", and the like, are words of convenience and are not to be construed as limiting terms.

In General

Referring now to the drawings, and particularly to FIG. 1, there is shown an elevational view of a fuel assembly, represented in vertically foreshortened form and being generally designated by the numeral 10. The fuel assembly 10 basically includes a lower end structure or bottom nozzle 12 for supporting the assembly on the lower core plate (not shown) in the core region of a reactor (not shown), and a number of longitudinally extending guide tubes or thimbles 14 which project upwardly from the bottom nozzle 12. The assembly 10 further includes a plurality of transverse support grids 16 axially spaced along the guide thimbles 14 and an organized array of elongated fuel rods 18 transversely spaced and supported by the grids 16. Also, the assembly 10 has an instrumentation tube 20 located in the center thereof and an upper end structure or top nozzle 22 attched to the upper ends of the guide thimbles 14. With such an arrangement of parts, the fuel assembly 10 forms an integral unit capable of being conventionally handled without damaging the assembly parts.

As mentioned above, the fuel rods 18 in the array thereof in the assembly 10 are held in spaced relationship with one another by the support grids 16 spaced along the fuel assembly length. Each fuel rod 18 includes nuclear fuel pellets 24 and the opposite ends of the rod are closed by upper and lower end plugs 26,28 to hermetically seal the rod. Commonly, a plenum spring 30 is disposed between the upper end plug 26 and the pellets 24 to maintain the pellets in a tight, stacked relationship within the rod 18. The fuel pellets 24 composed of fissle material are responsible for creating the reactive power of the nuclear reactor. A liquid moderator/coolant such as water, or water containing boron, is pumped upwardly through the fuel assemblies of the core in order to extract heat generated therein for the production of useful work.

To control the fission process, a number of control rods 32 are reciprocally movable in the guide thimbles 14 located at predetermined positions in the fuel assembly 10. Specifically, the top nozzle 22 has operatively associated therewith a rod cluster control mechanism 34 having an internally threaded cylindrical member 36 with a plurality of radially extending flukes or arms 38. Each arm 38 is interconnected to a control rod 32 such that the control mechanism 34 is operable to move the control rods 32 vertically in the guide thimbles 14 to thereby control the fission process in the fuel assembly 10, all in a well-known manner.

Outer Grid Strap Protruding Spring Repair Appartus

For precisely maintaining the spacing between the fuel rods 18 in the reactor core and preventing both lateral and longitudinally movement thereof, the support grids 16 are conventionally designed to impose spring forces on the fuel rods 18 directed from around the circumference of the individual rod radially inwardly toward the longitudinal axis of the rod. Each grid includes a multiplicity of interleaved inner straps (not shown) having an egg-crate configuration designed to form cells. The cells of each grid 16 accepting and supporting the fuel rods 18 at a given axial location therealong typically use relatively resilient springs (not shown) and relatively rigid protrusions or dimples (not shown) formed in the metal of the interleaved inner straps to generate the spring forces needed to hold the fuel rods therein.

Additionally, as seen in FIG. 2, outer straps 40 are attached together and peripherally enclose the grid inner straps to impart strength and rigidity to the grid 16. The outers straps 40 also conventionally have resilient springs 42 integrally formed into the metal thereof which project into respective ones of the cells disposed along the perimeter of the grid 16. On occasion one or more of the springs 42 formed in the outer straps 40 of the support grids 16 become deformed so as to protrude in an outwardly direction beyond the plane of the particular outer grid strap 40, an example of which is illustrated in FIG. 4.

Figure 4:
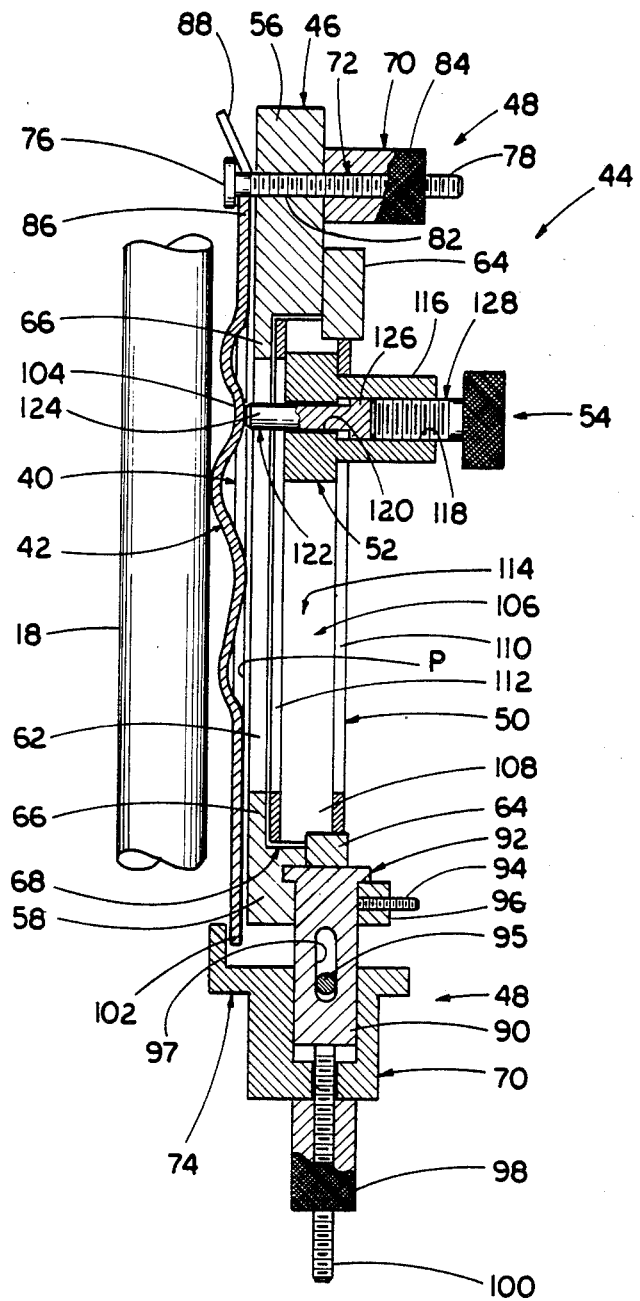
FIG. 4 is an enlarged sectional view of the protruding grid spring repair apparatus as taken along line 3—3 of FIG. 3, showing the apparatus mounted on an outer grid strap and disposed ready to reset the position of a protruding spring.

Turning finally to FIGS. 3 and 4, for resetting the deformed outwardly protruding spring 42 back to its original nonprotruding position where it was located inwardly of the plane P of the outer strap 42, the present invention provides an outer grip strap protruding spring repair appartus, generally designated 44. The outer grid strap spring repair apparatus 44 basically includes a support frame 46, means, generally designated 48, for attaching the frame 46 to the outer strap 40, an outer slide 50, an inner slide 52 and a spring reset mechanism 54.

The support frame 46 of the repair apparatus 44 is formed by a plurality of interconnected top, bottom and side members 56,58,60 defining a generally rectangular-shaped opening 62. Also, the frame 46 has a pair of spaced apart forward and rear rails 64,66 attached to each of the top and bottom members 56,58 along the upper and lower sides of the opening 62. The pairs of rails 64,66 together define a guide channel, indicated at 68, which extends therebetween and along the opening 62 in a direction paralleling the outer grid strap 40 and extending transversely across the strap spring 42 when the frame 46 is mounted to the grid 16.

For attaching the frame 46 to the outer grid strap 40 so that the frame opening 62 is aligned with the outwardly protruding spring 42 to be repaired, the attaching means 48 of the apparatus 44 includes a plurality of devices 70 mounted on the frame 46 above and below the frame opening 62. At least some of the devices 70 are adjustable for securing the frame 46 in a stationary position on the outer strap 40 so that the frame opening 62 is maintained in statonary alignment with the outwardly protruding spring 42.

Preferably, the frame attaching devices 70 are in the form of a pair of screws 72 and a pair of clips 74. Each of the screws 72 has a head 76 attached to one end of a threaded stem 78 which extends through either a tapped hole 80 or an elongated slot 82 in the top member 56 of the frame 46. The one screw 72 threaded into the tapped hole 80 maintains a stationary position along the frame 46, whereas the other screw 72 extending through the slot 82 can be adjusted to any desired position along the slot and then tightened by rotating an internally threaded knurled sleeve 84 on the end of the screw stem 78. In such manner, the heads 76 of the screws 72, being adapted to extend over and catch on an upper edge 86 of the outer grid strap 40, can also be fitted on opposite sides of a pair of the mixing vanes 88 disposed at spaced apart locations along the strap upper edge 86. Then, when the screws 72 are tightened so as to draw the heads 76 toward the frame 46, the grid strap upper edge 86 is captured between the frame 46 and the screw heads 76, and the frame 46 is thereby constrained from becoming dislocated laterally along the grid strap 40 as the apparatus 44 is being used.

Each of the clips 74 is mounted for vertical movement along the shank 90 of a pin 92 stationarily mounted by a set screw 94 through an outwardly projecting bracket 96 attached to bottom frame member 58. The clip 74 is held in the correct angular orientation on the pin shank 90 by a pin 95 extending through a slot 97 in the shank 90. The clip 74 can be set at any selected vertical position relative to the frame 46 by rotating an internally threaded knurled sleeve 98 on a threaded stem 100 connected on and depending below the pin shank 90. In such manner, the clip 74, being adapted to extend under and catch on a lower edge 102 of the outer grip strap 40, is drawn toward the strap lower edge 102 so as to capture it between the clip 74 and the frame 46.

Once the support frame 46 is attached on the outer strap 40 by the screws 72 and clips 74, the spring reset mechanism 54 can be moved to any position within the frame opening 62 to align it with the protruding portion 104 of the grid strap spring 42. Such alignment is carried out by first positioning the outer slide 50 at any selected position along the opening 62 between the frame side members 60 and then by positioning the inner slide 52 at any selected position between the top and bottom members 56,58 of the frame 46 along a passageway 106 defined through the outer slide 50.

The outer slide 50 of the repair apparatus 44 is in the form of a rectangular-shaped housing 108 having a pair of spaced front and rear vertical flanges 110,112 on opposite lateral sides thereof. The flanges 110,112 define the passageway 106 through the housing 108 and also a guide way, indicated at 114, extending between the flanges 110,112 and along the passageway in a direction paralleling the outer strap spring 42 which is generally orthogonal to direction of the guide channel 68 defined by frame rails 64,66. The outer slide housing 108 is mounted in the guide channel 68 of the frame 46 for reciprocable sliding movement along the frame opening 62 back an forth between lateral sides thereof for aligning its passageway 106 with the outwardly protruding portion 104 of the spring 42 on the outer strap 40.

The inner slide 52 of the repair apparatus 44 is in the form of a rectangular-shaped plate or block which supports the spring reset mechanism 54. The inner slide block 52 is mounted in the guide way 114 of the outer side housing 108 for reciprocable sliding movement along the housing passageway 106 back and forth between upper and lower sides thereof for aligning the spring reset mechanism 54 with the protruding portion 104 of the spring 42 on the outer strap 40.

Finally, the spring reset mechanism 54 is operable for resetting the protruding spring 42 to a nonprotruding position relative to the plane P of the outer strap 40 when the mechanism is aligned with the protruding portion 104 of the spring 42 by the inner slide plate 52. The reset mechanism 54 includes a cylindrical sleeve 116 attached to and extending outwardly from the inner slide block 52 and having a central bore 118 aligned with a smaller diameter passage 120 through the block 52. Also, the reset mechanism 54 includes a reset pin 122 having a stem 124 slidably mounted in the passage 120 and a larger head 126 slidably mounted in an inner portion of the sleeve central bore 118. Lastly, the reset mechanism 54 includes a manually-adjustable screw 128 threaded into an outer tapped portion of the central bore 118 of the sleeve 116 attached on the inner slide block 52. By rotation in the appropriate direction, the screw 128 is brought into engagement with the head 126 of the reset pin 122 for moving the pin stem 124 toward and into contact with the protruding portion 104 of the spring 42, as seen in FIG. 4. Then, upon further rotation of the screw 128, the protruding spring portion 104 can be deformed so as to return the spring 42 to its original nonprotruding position within the plane P of the outer grid strap 40.

Thus, it is seen that outwardly protruding outer grid strap springs 42 can be repaired by applying a substantially constant load to the spring and without the necessity of imposing any impact force against the fuel assembly 10. Also, because of the construction of the reset pin 122, it can only be moved a predetermined distance relative to the plane P of the outer strap 40. Specifically, it can only be moved until its head 126 bottoms out in the central bore 118 of the sleeve 116. Therefore, a repeatable and uniform repair procedure are assured.

It is thought that the present invention and many of its attendant advantages will be understood from the forgoing description and it will be apparent that various changes may be made in the form, construction and arrangment thereof without departing from the spirit and scope of the invention or sacrificing all of its material advantages, the form hereinbefore described being merely a preferred or exemplary embodiment thereof.

I claim:

1. A nuclear fuel assembly grid spring repair apparatus for repairing a spring formed on an outer strap of a fuel assembly grid and having a portion protruding outwardly beyond the strap, said appartus comprising:
   (a) a support frame defining an opening and having means defining a guide channel extending along said opening in a first direction;
   (b) means mounted on said frame and being adjustable for attaching said frame to the outer strap of the support grid so that said frame opening is aligned with the outwardly protruding spring on the outer strap;
   (c) an outer slide having a passageway defined therethrough and being mounted in said guide channel for reciprocable movement along said frame opening in said first direction for aligning said passageway with the outwardly protruding portion of the spring on the outer strap, said outer slide also having means defining a guide way extending along said passageway in a second direction generally orthogonal to said first direction;
   (d) a spring reset mechanism being operable for resetting the protruding spring to a nonprotruding position relative to the outer strap when said mechanism is aligned with the protuding portion of the spring; and
   (e) an inner slide supporting said spring reset mechanism and being mounted to said guide way for reciprocable movement along said passageway of said outer slide in said second direction for aligning said spring reset mechanism with the protruding portion of the spring on the outer strap.

2. The apparatus as recited in claim 1, wherein said support frame includes:
   a plurality of interconnected members defining said opening in a generally rectangular configuration; and
   a pair of spaced apart forward and rear rails attached to said members on upper and lower sides of said opening so as to define said guide channel therebetween which extends along said opening in said first direction.

3. The apparatus as recited in claim 1, wherein said adjustable attaching means includes a plurality of devices mounted on said frame above and below said frame opening for attaching said frame to the outer strap of the support grid, at least some of said devices being adjustable for securing said frame in a stationary position on the outer strap so that said frame opening is stationarily aligned with the outwardly protruding spring on the outer strap.

4. The apparatus as recited in claim 3, wherein said frame attaching devices include a plurality of screws having respective heads adapted to extend over and catch on an upper edge of the outer grid strap, said screws being mounted to said frame above said opening and adapted to be tightened toward said frame so as to capture the grid strap upper edge between screw heads and said frame.

5. The apparatus as recited in claim 4, wherein said frame attaching devices include a plurality of clips adapted to extend under and catch on a lower edge of the outer grip strap, said clips being mounted to said frame below said opening and adapted to be moved vertically toward and away from said frame so as to capture the grid strap lower edge between said clips and said frame.

6. The apparatus as recited in claim 1, wherein said outer slide is in the form of a rectangular-shaped housing having a pair of spaced front and rear vertical flanges on opposite lateral sides thereof defining a passageway through said housing and a guide way extending along said passageway in a second direction generally orthogonal to said first direction, said housing being mounted in said guide channel of said frame for sliding movement along said frame opening back and forth in said first direction between lateral sides thereof for aligning said passageway with the outwardly protruding portion of the spring on the outer strap.

7. The apparatus as rectied in claim 1, wherein said inner slide is in the form of a block supporting said spring reset mechanism and being mounted in said guide way of said housing for sliding movement along said housing passageway back and forth in said second direction between upper and lower sides thereof for aligning said spring reset mechanisms with the protruding portion of the spring on the outer strap.

8. The apparatus as recited in claim 1, wherein said spring reset mechanism includes:
   a reset pin slidably mounted in said inner slide; and
   a manually-adjustable screw threaded into said inner slide and into engagement with said pin for moving said reset pin toward and into contact with the protruding portion of the spring so as to cause return of the spring to its nonprotruding position.

9. A nuclear fuel assembly grid spring repair apparatus for repairing a spring formed on an outer strap of a fuel assembly grid and having a portion protruding outwardly beyond the strap, said apparatus comrprising:
   (a) a support frame having interconnected members defining a generally rectangular opening and a pair of spaced apart rails attached to said members on upper and lower sides of said opening so as to define a guide channel therebetween which extends along said opening in a first direction;
   (b) a plurality of devices mounted on said frame members above and below said frame opening for attaching said frame to the outer strap of the support grid, at least some of said devices being adjustable for securing said frame in a stationary position on the outer strap so that said frame opening is stationarily aligned with the outwardly protruding spring on the outer strap.
   (c) a rectangular-shaped housing having a pair of spaced apart vertical flanges on opposite lateral sides thereof defining a passageway through said housing and a guide way extending along said passageway in a second direction generally orthogonal to said first direction, said housing being mounted in said guide channel of said frame for sliding movement along said frame opening back and forth in said first direction between lateral sides thereof for aligning said passageway with the outwardly protruding portion of the spring on the outer strap;

(d) a spring reset mechanism being operable for resetting the protruding spring to a nonprotruding position relative to the outer strap when said mechanism is aligned with the protruding portion of the spring; and (e) a block supporting said spring reset mechanism and being mounted in said guide way of said housing for sliding movement along said housing passageway back and forth in said second direction between upper and lower sides thereof for aligning said spring rest mechanism with the protruding portion of the spring on the outer strap.

10. The apparatus as recited in claim 9, wherein said frame attaching devices include a plurality of screws having respective heads adapted to extend over and catch on an upper edge of the outer grid strap, said screws being mounted to said frame above said opening and adapted to be tightened toward said frame so as to capture the grid strap upper edge between said screw heads and said frame.

11. The apparatus as recited in claim 10, wherein said frame attaching devices include a plurality of clips adapted to extend under and catch on a lower edge of the outer grip strap, said clips being mounted to said frame below said opening and adapted to be moved vertically toward and away from said frame so as to capture the grid strap lower edge between said clips and said frame.

12. The apparatus as recited in claim 9, wherein said reset mechanism includes:

a reset pin slidably mounted in said block; and a manually-adjustable screw threaded into said block and into engagement with said pin for moving said reset pin toward and into contact with the protruding portion of the spring so as to cause return of the spring to its nonprotruding position.

* * * * *